May 5, 1953 — R. A. GROUSE — 2,637,766
METALLIZED PAPER CAPACITOR
Filed Jan. 11, 1949 — 3 Sheets-Sheet 1
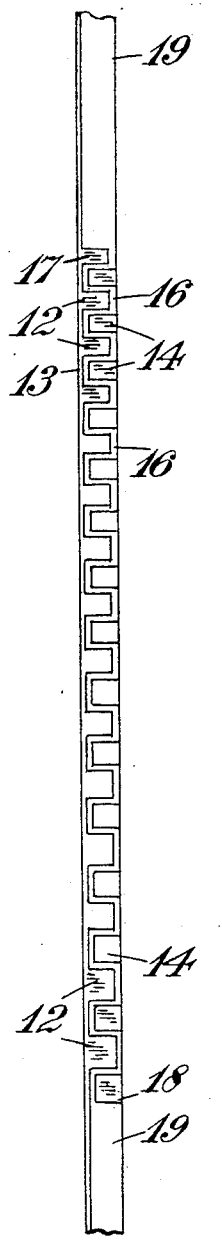
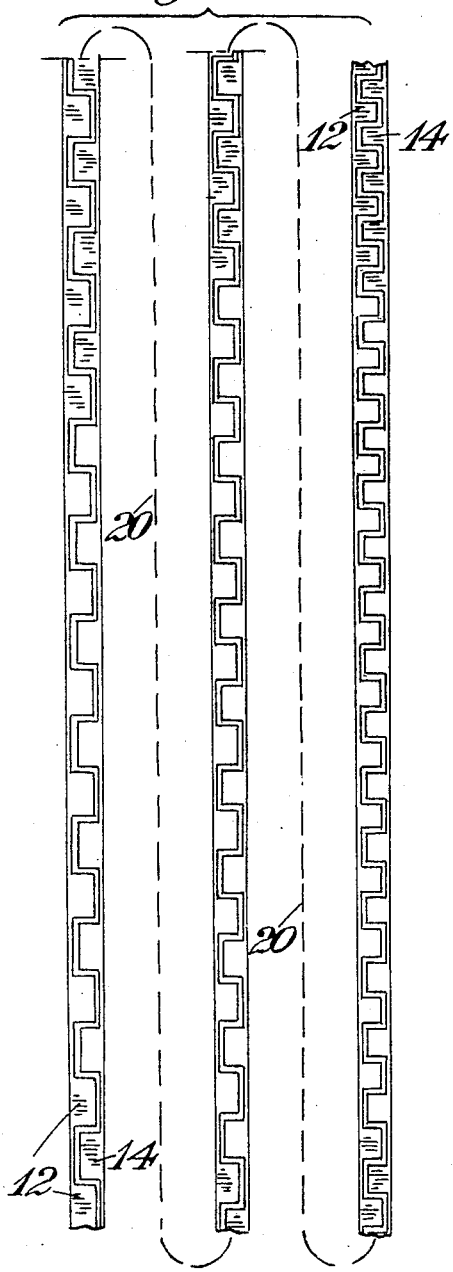
INVENTOR
Richard A. Grouse
By Watson, Cole, Grindle & Watson May 5, 1953

R. A. GROUSE 2,637,766

METALLIZED PAPER CAPACITOR

Filed Jan. 11, 1949

INVENTOR
Richard A. Grouse

By Watson, Cole, Grindle & Watson

May 5, 1953 R. A. GROUSE 2,637,766
METALLIZED PAPER CAPACITOR
Filed Jan. 11, 1949 3 Sheets-Sheet 3
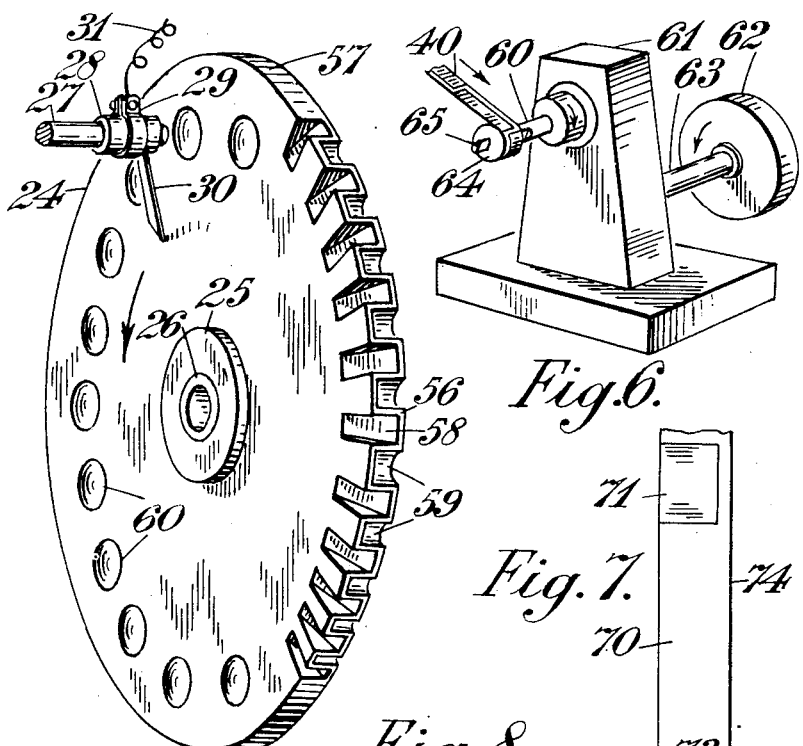
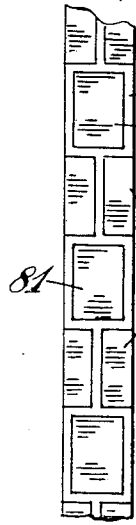
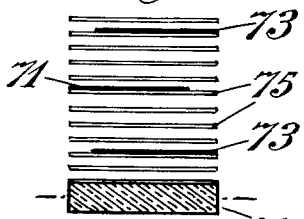
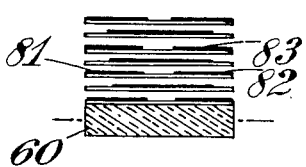
INVENTOR
Richard A. Grouse
By Watson, Cole, Grindle + Watson Patented May 5, 1953

2,637,766

UNITED STATES PATENT OFFICE 2,637,766

METALLIZED PAPER CAPACITOR

Richard Alfred Grouse, London, England, assignor to A. H. Hunt Capacitors Limited, London, England, a British company Application January 11, 1949, Serial No. 70,237
In Great Britain July 15, 1948

7 Claims. (Cl. 175—41)

This invention comprises improvements in or relating to metallised paper capacitors. Electrical capacitors are well known which are made by winding two strips of metallised paper together and making connection at one end of the roll so formed with the metallisation of one strip of paper and at the other end of the roll with the metallisation of the other strip of paper. Such a capacitor is for example described in U. S. patent specification No. 2,388,139. The use of metallised paper greatly simplifies winding capacitors as compared with winding plain paper and metal foil together, and also much reduces the size of the capacitors for a given capacity. However, very small capacitors, that is to say those having a very small electrical capacity, are sometimes called for and difficulty is encountered in making rolls of two metallised papers which will have sufficiently few turns of sufficiently small diameter to correspond with the electrical requirements and at the same time will be solid enough to be readily handled in manufacture without deformation, and one of the objects of the present invention is to provide a form of capacitor which will satisfactorily meet these conditions, although it is to be understood that the form of capacitor herein described is not necessarily limited in its applicability to the minute capacities referred to.

According to the present invention an electrical capacitor has for its essential operating portion a strip of metallised paper whereof the metallised surface is subdivided by a continuous non-metallised portion extending in a devious course along the strip between separate metallised areas so as to form a repeated pattern in which some metallised areas extend across the strip from one edge and some from the other, the strip being wound into a roll so that in the roll different metallised areas overlap one another, the areas extending from one edge being connected to one pole of the capacitor and those extending from the other edge being connected to the other pole. In this way it becomes possible to wind a capacitor from a single strip of metallised paper, and this not only permits the winding of narrower strips but also permits them to be wound upon a smaller core support than can be adopted when it is necessary to wind two strips of paper together, and for both reasons a smaller and more solid paper roll results. Although the capacity for a given quantity of metallised paper may be less than when two strips are wound together, in the case of very small capacities this is immaterial. In one form of capacitor according to the invention the non-metallised portion of the surface forms a continuous narrow band which repeatedly deviates first toward one side of the strip and then toward the other.

If a sinuous line of demetallisation of constant pitch from one undulation to the next is traced along a strip of metallised paper the extent of overlapping of the areas on opposite sides of the line will depend upon the particular circumference of the roll in relation to the pitch and will vary as the circumference of the roll builds up. In fact, if the circumference happens to exactly equal the pitch there will for a few turns be substantially no such overlapping, but all that this involves is a certain small waste of paper. However, if it is important to get as much capacity into a given size of roll as possible, it may be advisable to correlate the pitch of the undulations of the demetallised band which extends along the strip of paper with the diameter of the roll.

According, therefore, to a further feature of this invention the pitch of the successive repeats of the pattern formed by the demetallised band gradually increases from one end toward the other of the metallised strip and corresponds at least approximately with twice the circumference of the roll at the portion of the roll which the strip when wound occupies, so that successive metallised portions of different polarity overlap one another with approximate exactitude. Preferably the shape of the pattern formed by the demetallised band is not a curved sinuous line but takes the form of a line which runs round rectangular areas; that is to say the line forms a key pattern as this affords the maximum areas of overlap between different polarities.

When metallised paper is used of which the paper base is very thin there is a limit to the voltage which can be applied to a capacitor without breakdown, and in winding capacitors from a plurality of strips of paper it is common to provide against this by winding in with the strips of metallised paper strips of plain paper to act as additional insulation. If this were done according to the present invention the difficulty of winding more than one strip at a time, which the invention is primarily intended to overcome, would still exist, and accordingly preferably other means are adopted according to the present invention for increasing the breakdown voltage. According to one feature of the invention the non-metallised portion of the strip comprises additional unmetallised areas arranged upon the strip between the successive metallised areas, the additional unmetallised areas being large enough to interpose an additional layer of paper between the metallised areas when the roll is wound. It will be observed that if the pitch of the successive repeats of the pattern formed by the demetallised band gradually increases as already described, the additional unmetallised areas will exactly fit between the metallised areas and a simple way is provided of affording a high voltage rolled condenser from a single strip of metallised paper.

Furthermore, in addition to the metallised areas which extend across the strip from opposite edges, there may be intermediate areas isolated from the edges of the strip, so that in the wound roll the isolated areas are electrically in series with the areas connected to the poles of the capacitor.

The invention includes a process of producing strips of metallised paper for making electrical capacitors consisting in taking a strip of paper metallised on one face and passing it continuously into contact with a demetallising electrode while maintaining the metallised face at a potential sufficiently different from that of the demetallising electrode to ensure that at the point of coming into contact between the surfaces of the metallised paper and of the demetallising electrode there is a passage of electric current sufficient to demetallise the paper, the demetallising electrode being formed or moved so that it comes into contact with the metallised surface of the paper along a course which is of the same shape as the shape of the desired demetallised area.

The following is a description by way of example of the manufacture of capacitors by certain specific methods in accordance with the invention, reference being made to the accompanying drawings in which Figure 1 is a representation of a metallised paper strip according to the present invention;

Figure 2 is a representation of another such strip;

Figure 4 is a perspective view of a demetallising roller used in the apparatus of Figure 3;

Figure 6 is a diagram of a winding apparatus;

Figure 7 shows a modified form of partially demetallised strip;

Figure 8 is a partial diagrammatic section of an electrical capacitor roll wound with the strip according to Figure 7;

Figure 9 is a view of another form of strip, and

Figure 10 is a diagrammatic section through part of a condenser roll wound with the strip of Figure 9.

Figure 3:
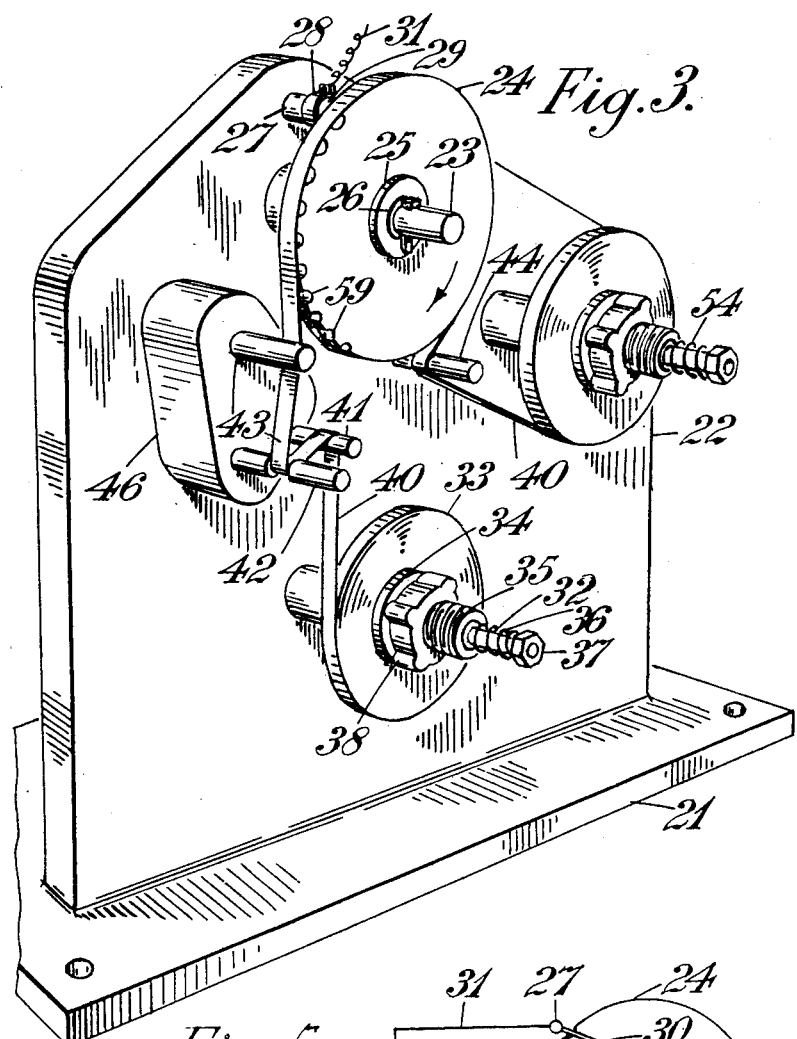
Figure 3 is a perspective view of a demetallising apparatus.
Figure 5:
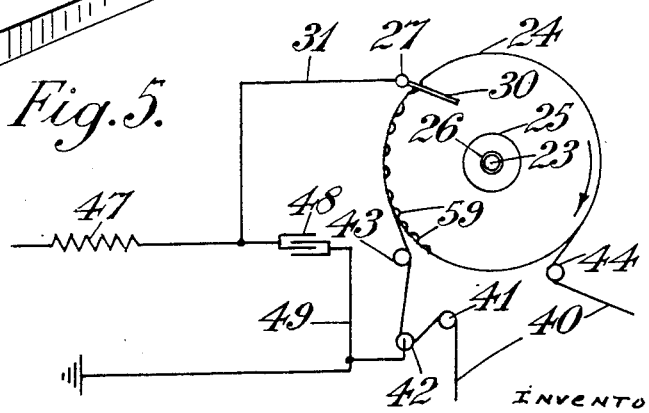
Figure 5 is a connection diagram.

Referring to Figure 1, a strip 11 of paper is covered with metallised areas 12 which extend from one edge 13 of the strip, and which alternate with metallised areas 14 extending from the other edge 15. The metallised areas 12 are separated from the areas 14 by a narrow demetallised band 16 which follows a key pattern, repeating itself continuously along the strip. The pitch of the repeats of the key pattern gradually increases, being smallest at the beginning of the pattern at 17 on the band and longest at the end of the pattern at 18. The paper is completely demetallised on the end portions 19 beyond the key pattern so as to form plain paper end strips which can be used for the first few turns and the last few turns when the strip is wound into a condenser roll.

The increase in pitch of the repeats of the key pattern demetallised band 16 is co-related to the thickness of the paper of which the strip is made, so that if the strip 11, commencing near the end 17 of the pattern, is wound on a mandrel of a particular size such that after the initial few turns of unmetallised paper the metallised area 17 as applied is equal to the length of the first metallised area, plus the width of the demetallised band which cuts it off from the next metallised area, the result will be that as the roll builds up and the circumference of each turn wound on the roll increases so the pitch of the repeats of the key pattern 16 increases. Therefore, each of the areas 12 will be exactly overlaid in the next turn with an area 14, and in the completed roll if the areas 12 are connected to one pole of the capacitor and the areas 14 to the opposite pole, the result will be a capacitor in which the alternate areas 12 and 14 exactly overlap one another and the capacity will be practically as great as if an equal quantity of paper wound in two strips of opposite polarity were made into a condenser roll in the known manner. In practice some inaccuracy in the overlap of the successive metallised areas may occur, but this will not prevent the wound roll from having a substantial capacity and in practice, especially for the small capacities, the gain in simplicity due to only having to wind a single strip of paper much out-balances the slight loss of efficiency due to possible inaccuracies in registering the successive turns comprising areas 12 and 14 with one another.

The strip shown in Figure 1 comprises comparatively few areas 12 and 14, and in Figure 2 there is shown a strip comprising a much larger number of areas 12 and 14 succeeding one another and separated by a key pattern as in the case of Figure 1. In Figure 2 the strip is too long to be shown in a single piece and has been sub-divided into three portions, the chain lines 20 serving to indicate how in actual fact the one portion is joined on to the other.

The strips shown in Figures 1 and 2 can be produced on apparatus such as is shown in Figures 3 to 6. Referring to Figure 3, upon a base 21 there is an upstanding support 22 for a number of horizontal spindles which include a spindle 23 on which is mounted for rotation a demetallizing roller 24. The roller 24 has a hub 25 made of insulating material in which is a bush 26 to run on the spindle 23. A stem 27 projects from the support 22 and carries an insulating bush 28 on which is mounted a brush holder 29 which supports a brush 30 made of flexible Phosphor bronze strip which bears on the face of the roller 24, and is connected by a wire 31 to a source of electric current.

Also mounted upon the support 22 is a spindle 32 parallel to the spindle 23, and serving to support a roll 33 which consists of a long strip of metallised paper. This is wound on a Bakelite core member 34, and the core member forms a hub which is slipped over a bush 35. The bush 35 runs on the spindle 32, and is pressed against a shoulder on the spindle by means of a spring 36 on the end of the spindle held in place by a nut 37. The bush 35 is screwthreaded on its external surface, and a nut member 38 upon it serves to screw the Bakelite core 34 against a flange formed on the other end of the bush 35 behind the roll 33. Therefore, the roll is held firmly on the bush 35, and is positioned accurately as to its plane by the pressure of the spring 36 against the bush. The strip of metallised paper is led off the roll 33 as shown at 40 and is led around guide rollers 41, 42, 43 and thence around the demetallising roller 24. From the demetallising roller it passes around a guide roller 44 on to a wind-up roll 45. The guide rollers 41, 42, 43 project from a casing 46 which houses ball races to support the rollers so that they turn over easily. The metallised face of the paper strip 40 is arranged to come in contact with the demetallising roller 24, and it will be observed that the same metallised face will be in contact with the roller 42. The roller 42 is connected through the metal support 22 to earth, and therefore there will be a potential difference between this face of the paper and the demetallising roller 24 which, as before described, is connected to an electrical supply. As can be seen from the connection diagram, Figure 5, the electric supply is connected through a resistance 47 to the brush 30 by way of the line 31, and there is a condenser 48 which connects the brush 30 to a line 49 leading to the roller 42 and earth. These connections are similar to those described in U. S. application No. 679,532 for the demetallising process therein described, and the result is that as the metallised surface of the paper strip 40 meets the surface of the roller 24, an electrical discharge takes place between the roller and the metallised surface which removes the metallisation from the surface of the paper without, however, burning the paper itself. The metallisation upon the paper is exceedingly thin as referred to in the aforesaid application 679,532 namely about 80 millimicrons of aluminum. The paper itself is only about 8 microns thick but is not burnt by the discharge.

The wind-up roll 45 is mounted on a bush 50 on a spindle 51. A nut 52 on the bush 50 serves to tighten the hub 53 of the roll 45 on the bush, and the bush is held frictionally to the spindle 51 by the pressure of a spring 54, the construction of these parts being similar to the construction of the bush 35 on the spindle 32 already described. There is however a difference in that the spindle 51 instead of being stationary is made rotatable in a boss 55 on the support 22, and is driven at a suitable speed by a pulley mounted on the spindle 51 at the rear side of the support and not appearing in Figure 3 of the drawing. Therefore, the strip 40 will be frictionally driven from the spindle 51 and drawn through the apparatus, but owing to the friction drive afforded by the spring 54 there will be no tendency to snatch or tear the strip 40 when starting the apparatus. It is found desirable to make the earthing roller 42 of a smaller diameter than the other guide rollers, and to determine its exact diameter experimentally to suit the exact running conditions of the machine, so that the metallised paper gets a suitable pressure upon the earthing roller, which is sufficient to ensure that no demetalisation takes place at the surface of the earthing roller itself without being so great as to cause rupture of the paper strip. As will be seen in the drawing, the roller 42 is shown as being of smaller diameter where the strip 40 passes around it, and in practice if any tendency is found to an electric discharge at the contact between the roller 42 and the metallised surface, the diameter of the roller 42 is reduced until it is found that such discharge disappears, because any discharge at this roller would tend to demetallise the paper all over its surface and would, by the partial removal of the metallised surface, reduce the capacity of the capacitors which are the eventual product of the manufacture.

The periphery of the demetallising roller 24 is formed with a pattern which corresponds to the key pattern shown in Figures 1 and 2. The roller as shown in detail in Figure 4 of the drawing has a key pattern edge 56 corresponding to the demetallised key pattern of the line 16 of Figure 1. This extends part of the way round the roller, and the remaining surface of the roller has a plain cylindrical surface as shown at 57 and serves to produce the completely demetallised portions 19 of the strip 11 of Figure 1. It will be noted that the key pattern portion of the edge 56 is made by milling out from the edge a number of notches 58 which run out into one face of the roller and by milling out between them other notches 59 which run out into the opposite face of the roller. The notches 58 can be rapidly machined by a plain cylindrical milling cutter, but if similar notches were cut in the opposite face of the roller, as they will be of constant width, they would tend at the portion which lies nearest to the axis of the roller 24 to run into the metal of the notches on the opposite side, or to make the walls between the notches unduly thin. The notches 59 are therefore cut with an end milling cutter, and have a cylindrical bottom as can be seen clearly from the drawing. In order to balance the roller and allow for the removal of metal which has taken place in cutting the notches 58, 59, a certain amount of metal is removed by shallow drill holes 60 on the opposite side of the roller near the circumference. The roller is very carefully balanced because it has to be driven by means of the pull exerted by the weak paper strip 40.

For producing a strip such as the strip shown in Figure 2 of the drawing a similar roller to the roller 24 of Figure 4 is used, but the key pattern notches 58, 59 are continued around the greater proportion of its circumference and it is one of the features of the apparatus shown in Figures 3 to 6 inclusive that an appropriate pattern of roller can be provided for all the designs of capacitor which are to be made within a wide range, and in order to change from producing paper suitable for one design of capacitor to paper suitable for another design, all that is necessary is to change the demetallising roller, substituting for it another roller of the same diameter but different design and leaving all the adjustments of the apparatus untouched.

After the strip 40 has been wound into the roll 45 until the roll is full, the roll 45 is removed from the apparatus and capacitors are then wound therefrom on any suitable winding apparatus. This may be much simpler than ordinary apparatus for winding paper condensers, and preferably comprises a short sub-mandrel such as 60, Figure 6, which projects from a gear box 61 and is driven by a V-groove pulley 62 on a driving shaft 63. The strip 40 is wrapped by the operator around the stub-mandrel 60 for the first turn by hand, and then the apparatus is started up and a condenser roll 64 is wound up thereon. As will be appreciated there would be a suitable support for the roll 45 from which the strip 40 is unwound, and ordinarily it would be passed around one or more tensioning rollers on its way to the mandrel 60. The mandrel 60 may have a flat face such as is indicated at 65 to assist in driving the paper strip when the roll 64 is being built up.

As soon as a condenser roll is completely wound on to the mandrel 60, the end turn is stuck temporarily down by a patch of adhesive or by a spot of grease or otherwise, and the condenser roll is slipped endwise off the mandrel, the end of which is left free, as shown in Figure 6 for the purpose and then the winding of a further capacitor upon the mandrel can commence without delay.

The completed rolls are sprayed on the ends in a similar way to that described in U. S. patent application No. 490 to afford a base of sprayed copper or the line to which terminal wires or terminal caps may be soldered. In practice the diameter of the stub-mandrel 60 may be very small, say $\frac{1}{16}$ or $\frac{3}{64}$ of an inch, from which the small size of the capacitors producible in accordance with the invention may be gauged. Capacitors $\frac{1}{16}$ of an inch in diameter and $\frac{1}{4}$ of an inch long are easily producible according to this invention, and using paper 8 microns thick will have a capacity of about 0.01 microfarad. If the thickness of the paper is increased to 15 microns the capacity may be reduced to 0.003 microfarad. In the former case the capacitor will stand a voltage of 150 volts, while with paper 15 microns thick the capacitor may withstand 350 volts, using varnished paper in both cases.

Where a still higher voltage needs to be withstood it is possible to use a strip which is demetallised as shown in Figure 7 at 70 having widely spaced metallised areas 71 which extend from the edge 72 of the strip and intermediate metallised areas 73 which extend from the edge 74. Referring to Figure 8, if 60 represents the mandrel on which the capacitor is wound then there may be several layers 75 of demetallised paper lying between layers 71, 73 of metallised area, and this increases the insulation resistance of the capacitor, while at the same time of course also reducing its capacity.

Alternately a strip may be demetallised as shown in Figure 9 at 80 so that it has areas 81 which extend from one edge of the strip and which lie opposite areas 82 which extend from the other edge of the strip, and between the areas there may be other metallised areas 83 which do not extend so far as either edge of the strip. In the result when the capacitor is wound as shown in Figure 10, the areas 81, 82 alternate with turns of paper which carry the areas 83, and the result is the equivalent of two capacitors in series with one another. This idea can obviously be developed further by increasing the number of areas which become interleaved between areas such as 81, 82 when the capacitor is wound, a large number of possible patterns, making for multiple series or series parallel wound capacitors, being possible.

It will be appreciated that only one method of producing the demetallised patterns on the strip has been described by way of example, and any other method of producing such patterns might be adopted although the one described is the best known to the applicants. Among other methods the method described in the provisional specification may be adopted.

I claim:

1. An electrical capacitor roll suitable for use in capacitors of small size and low capacity, comprising a convolutely wound single elongated thin, narrow web of dielectric material having upon one surface thereof a longitudinally extending series of extremely thin low resistance metallic film electrodes forming a repeated pattern, some of said electrodes extending inwardly from one edge of the web and others extending inwardly from the opposite edge of the web, those electrodes terminating at one edge of the web being electrically insulated by a non-metallized area of the web from the electrodes terminating at the opposite edge and the electrodes of each such series of electrodes being electrically connected by portions of the metallic film deposited upon said web, the electrodes of one polarity overlying the electrodes of the other polarity.

2. An electrical capacitor as claimed in claim 1 wherein the non-metallized portion of the surface forms a continuous narrow band which repeatedly deviates first toward one side and then toward the other of the strip.

3. An electrical capacitor as claimed in claim 1 wherein the pitch of the successive repeats of the pattern formed by the demetallized portion gradually increases from one end toward the other of the metallized strip and corresponds at least approximately with twice the circumference of the roll at the portion of the roll which the strip when wound occupies, so that successive metallized portions of different polarity overlap one another with approximate exactitude.

4. An electrical capacitor as claimed in claim 1 wherein the non-metallized portion of strip comprises additional unmetallized areas arranged upon the strip between the successive metallized areas, the additional unmetallized areas being large enough to interpose an additional layer of paper between the metallized areas when the roll is wound.

5. An electrical capacitor roll comprising a convolutely close-wound single elongated web of dielectric material having upon one surface thereof a longitudinally extending series of metallic film electrodes forming a repeated pattern, some of said electrodes extending inwardly from one edge of the web and others extending inwardly from the opposite edge of the web, those electrodes terminating at one edge of the web being electrically insulated from the electrodes terminating at the opposite edge, and a terminal electrically connected to electrodes terminating at one edge and another terminal electrically connected to electrodes terminating at the opposite edge, the electrodes connected to one terminal overlying the electrodes connected to the other terminal.

6. An electrical capacitor roll suitable for use in capacitors of small size and low capacity, comprising a convolutely wound single elongated thin, narrow web of dielectric material having upon one surface thereof a longitudinally extending series of extremely thin low resistance metallic film electrodes forming a repeated pattern, some of said electrodes extending inwardly from one edge of the web and others extending inwardly from the opposite edge of the web, those electrodes terminating at one edge of the web being electrically insulated from the electrodes terminating at the opposite edge by a non-metallised portion of the surface of the web, such non-metallised portion forming a continuous elongated non-metallised area extending longitudinally of the web from one end of the pattern to the other, and a terminal electrically connected to electrodes terminating at one edge of the web and another terminal electrically connected to electrodes terminating at the opposite edge, the electrodes terminating at one edge of the web overlying the electrodes terminating at the opposite edge of the web.

7. An electrical capacitor as claimed in claim 5 wherein in addition to the metallised electrodes which extend across the strip from opposite edges there are intermediate electrodes isolated from the edges of the strip, so that in the wound roll the isolated electrodes are electrically in series with the electrodes connected to the terminals of the capacitor.

RICHARD ALFRED GROUSE.

References Cited in the file of this patent

UNITED STATES PATENTS

| Number | Name | Date |
|---|---|---|
| 1,647,474 | Seymour | Nov. 1, 1927 |
| 1,744,616 | Cunningham | Jan. 21, 1930 |
| 2,151,686 | Briefer | Mar. 28, 1939 |
| 2,163,294 | Simons | June 20, 1939 |
| 2,216,558 | Ortlieb | Oct. 1, 1940 |
| 2,382,065 | Kappeler | Aug. 14, 1945 |
| 2,437,212 | Schottland | Mar. 2, 1948 |

FOREIGN PATENTS

| Number | Country | Date |
|---|---|---|
| 563,084 | Great Britain | July 28, 1944 |